United States Patent [19]

Ohoka

[11] Patent Number: 4,527,443
[45] Date of Patent: Jul. 9, 1985

[54] DEVICE FOR SUPPORTING AND SEALING A FINAL DRIVE SHAFT BEARING IN A SPEED CHANGE GEAR

[75] Inventor: Yuzo Ohoka, Tokyo, Japan

[73] Assignee: Honda Giken Kogyo Kabushiki Kaisha, Tokyo, Japan

[21] Appl. No.: 437,555

[22] Filed: Oct. 29, 1982

[30] Foreign Application Priority Data

Oct. 29, 1981 [JP] Japan ................. 56-173198

[51] Int. Cl.³ ................. F16H 1/14; F16H 1/20
[52] U.S. Cl. ................. 74/417; 74/423
[58] Field of Search ................. 74/417, 423; 308/236, 308/197.1

[56] References Cited

U.S. PATENT DOCUMENTS

| | | | |
|---|---|---|---|
| 2,022,290 | 11/1935 | Large | 74/417 |
| 2,687,653 | 8/1954 | Almen | 74/417 |
| 2,750,806 | 6/1956 | Hobbs | 74/417 |
| 3,382,838 | 5/1968 | Bergstedt | 74/417 |
| 3,442,444 | 5/1969 | Kievit | 74/417 |
| 3,943,790 | 3/1976 | Meyer | 74/417 |
| 4,191,063 | 3/1980 | Borgersen | 74/417 |
| 4,282,765 | 8/1981 | Ashauer et al. | 74/417 |

FOREIGN PATENT DOCUMENTS

119246  9/1980  Japan ................. 74/417

Primary Examiner—Lawrence J. Staab
Assistant Examiner—Michael David Bednarek
Attorney, Agent, or Firm—Armstrong, Nikaido, Marmelstein & Kubovcik

[57] ABSTRACT

A device for supporting and sealing a final drive shaft bearing in a speed change gear having a construction in which a final drive shaft is supported by a bearing holder via a rolling element bearing and the bearing holder is fitted and fixed to a gear box. A stopper flange is formed at the inner end portion of the bearing holder and a first nut is screwed to the outer end portion of the bearing holder so as to clamp the outer race of the rolling element bearing in cooperation with the stopper flange. A seal housing is integrally formed with the bearing holder and extends outside the nut. An oil seal is fitted to the seal housing and has a seal lip that comes into contact with the outer circumferential surface of the drive shaft. The final drive shaft is equipped with a helical bevel gear and the rolling element bearing consists of a double-row angular contact type bearing. A second nut for clamping the inner race of the bearing in cooperation with the bevel gear is screwed to the final drive shaft.

3 Claims, 2 Drawing Figures

DEVICE FOR SUPPORTING AND SEALING A FINAL DRIVE SHAFT BEARING IN A SPEED CHANGE GEAR

BACKGROUND AND SUMMARY OF THE INVENTION

This invention relates to a device for supporting and sealing a final drive shaft bearing for use in a speed change gear having the construction in which the final drive shaft is supported by a bearing holder via a rolling element bearing and the bearing holder is fitted and fixed to a gear cox.

The present invention is directed to provide a device of the above-mentioned type having a simplified construction with a small number of components in which the rolling element bearing is firmly fitted to the bearing holder and the leak of a lubricant passing through the rolling element bearing can be reliably prevented inside the bearing holder.

In accordance with the present invention, in order to accomplish the above object, there is provided a device for supporting and sealing a final drive shaft bearing in a speed change gear which comprises a gear box; a bearing holder fitted and fixed to the gear box and having a stopper flange at the inner end thereof; a final drive shaft supported by the bearing holder via a rolling element bearing, the rolling element bearing having an outer race and an inner race; a first nut screwed to the outer end portion of the bearing holder and clamping the outer race of the rolling element bearing in cooperation with the stopper flange at the inner end portion of the bearing holder; a seal housing formed integrally with the bearing holder and extending outside the first nut screwed to the bearing holder; and an oil seal disposed in the seal housing and having a seal lip coming into contact with the outer circumferential surface of the drive shaft.

The construction described above makes it possible to firmly fit the rolling element bearing to the bearing holder and to support always and stably the final drive shaft.

The seal housing is integrally formed with the bearing holder so as to extend outside the nut and the oil seal coming into contact with the outer circumferential surface of the final drive shaft is fitted to the seal housing. This arrangement eliminates the necessity of disposing an exclusive member for the seal housing and the device having a simple construction can be produced at a reduced cost of production. Moreover, since a part of the inner circumferential surface of the bearing holder serves also as the inner circumferential surface of the seal housing, the rolling element bearing and the oil seal can be easily aligned coaxially, thereby preventing deflection of the axis of the seal lip of the oil seal. Hence, the oil seal can exhibit its full function and can reliably prevent the leak of a lubricant passing through the rolling element bearing. The oil seal also protects the screw portion of the nut from external dust and mud water and prevents luster so that disassembly and maintenance can be easily made.

According to one embodiment of the present invention, the final drive shaft is equipped with a helical bevel gear and the rolling element bearing consists of one double-row angular contact type bearing. Further, a second nut is screwed to the final drive shaft to clamp the inner race of the bearing in cooperation with the bevel gear. With this arrangement, the bevel gear can be strongly supported on the bearing holder in the radial direction as well as in the axial direction via one double-row angular contact type bearing and the two nuts. Therefore, even if the direction of a thrust load acting upon the helical bevel gear changes together with conversion of the power transmitting direction, the thrust load can be always transmitted to and borne by the bearing holder via the bearing and the displacement of the gear in the axial direction can be reliably restricted. In consequence, back-lash of the engaging portion of the gear with a mating bevel gear can be prevented.

The device of the invention reduces the number of necessary components and is simple in construction. In addition, an assembly of the bearing holder and the helical bevel gear is produced in advance and is fitted to the gear box so that the device as a whole can be easily assembled with an extremely high level of productivity.

DESCRIPTION OF THE PREFERRED EMBODIMENT

Figure 1:
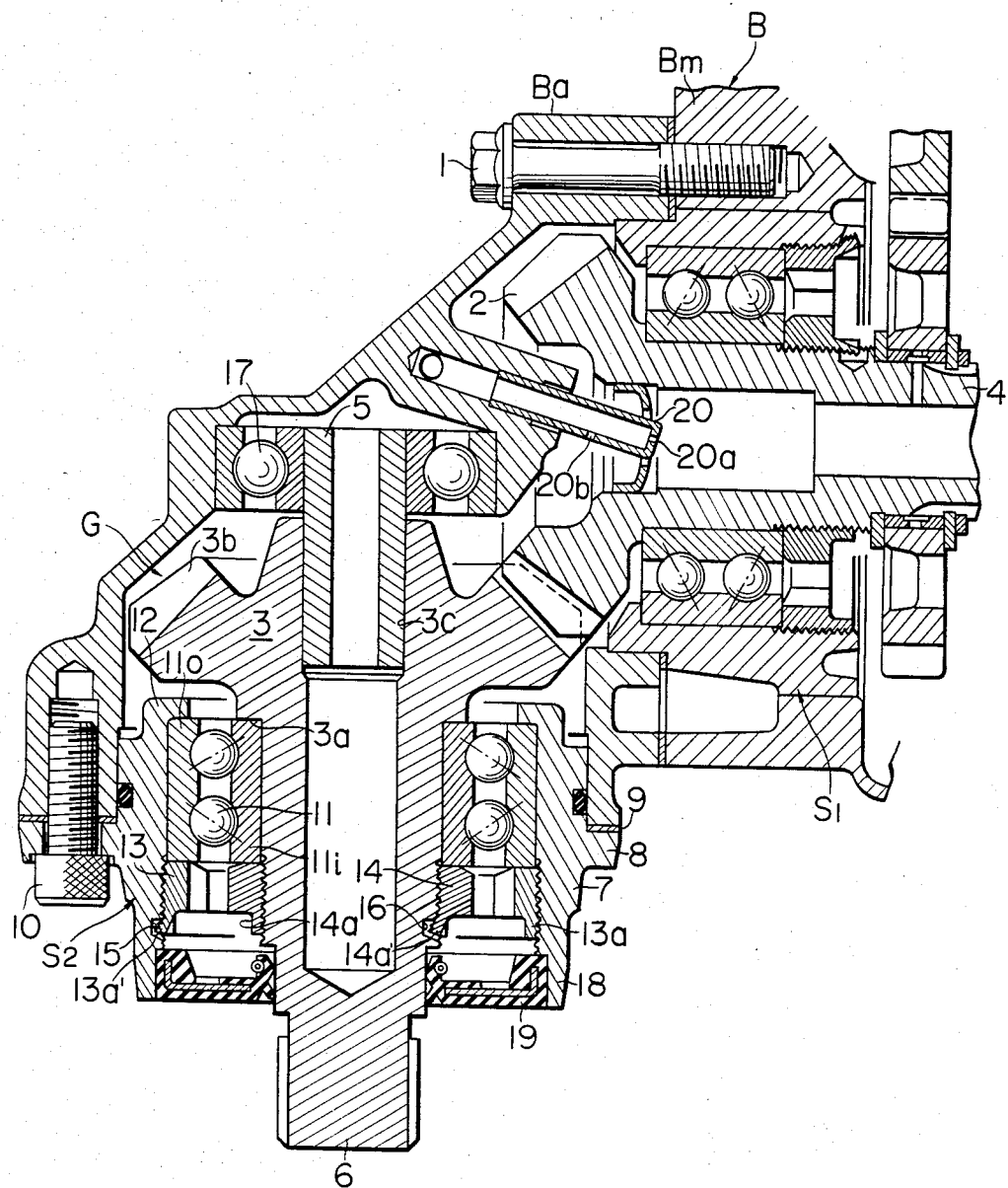
FIG. 1 is a longitudinal sectional plan view of a speed change gear of a motorcycle equipped with the device in accordance with the present invention.
Figure 2:
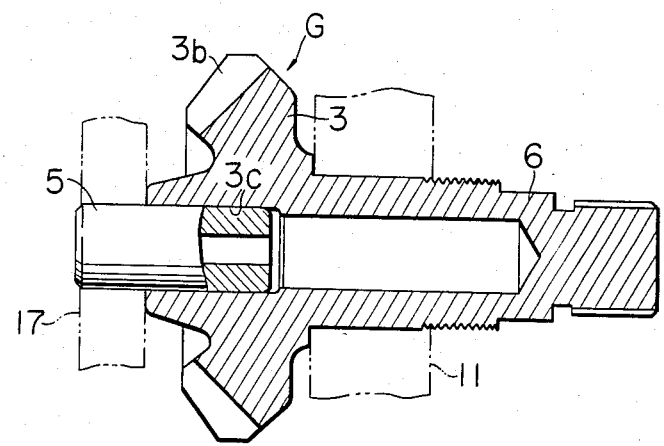
FIG. 2 is a longitudinal sectional side view of its bevel gear assembly.

Hereinafter, one preferred embodiment of the present invention will be described with reference to the accompanying drawings. Symbol B represents a gear box of a speed change gear mounted to a motorcycle. The gear box B consists of a main gear box $B_m$ and an auxiliary gear box $B_a$ fixed to one side surface of the main gear box by a bolt 1. A drive bevel gear 2 and a follower bevel gear 3 engaging with each other are incorporated in the auxiliary gear box $B_a$. In the embodiment shown in the drawings, these bevel gears 2, 3 are of the helical gear type. The drive bevel gear 2 is formed integrally at the outer end of a transmission output shaft 4 disposed inside the main gear box $B_m$ in the transverse direction of the motorcycle. The follower bevel gear 3 is integrally equipped on its front surface with bevel teeth 3b and a rear support shaft, that is, a final drive shaft 6, is integrally extended from the rear surface of the follower bevel gear 3. Accordingly, threading of the bevel teeth 3b can be made simply with a high level of accuracy. The final drive shaft 6 is disposed in the longitudinal direction of the motorcycle and is interconnected to a propeller shaft, not shown, so as to drive the rear wheel of the motorcycle via the propeller shaft.

A shaft hole 3c is bored on the front surface of the bevel gear 3, on which the bevel teeth 3b are formed, in the concentric arrangement with the rear support shaft 6. A front support shaft 5 is pushed (at a push load of at least 3.5 tons) into this shaft hole 3c and is fixed thereto, thus forming a bevel gear assembly G. The front support shaft 5 projects forward from the bevel gear 3 and its projecting length is selected so that it can be sufficiently supported by a bearing. Accordingly, the center of the bevel gear 3 can be aligned with the axes of the front and rear support shafts 5, 6 and be stably supported with a high level of accuracy, ensuring smooth rotation without deflection of the axes.

Both bevel gears 2 and 3 are supported by the main gear box $B_m$ and auxiliary gear box $B_a$ via support devices $S_1$ and $S_2$, respectively. Since both support devices have substantially the same construction, only the latter $S_2$ will be hereby explained.

A bearing holder 7 is fitted to the open rear end portion of the auxiliary gear box $B_a$ and a fitting flange 8 formed around the outer circumference of the holder so as to project therefrom is placed upon the rear end surface of the auxiliary gear box $B_a$ so as to interpose a shim 9 between them, and is fixed by a bolt 10. The final drive shaft 6 of the follower bevel gear 3 is turnably supported by this bearing holder 7 via one angular contact type ball bearing 11 which is an antifriction bearing. A stopper flange 12, which comes into contact with the outer race 11o of the ball bearing 11, is formed at the inner end of the bearing holder 7, and a first nut 13 which clamps the outer race 11o in cooperation with the stopper flange 12 is screwed to the inner circumferential surface at the outer end portion of the bearing holder 7. To prevent the first nut 13 from getting loose, a part 13a' of an annular reduced thickness portion 13a formed on the outer circumferential surface and at the outer end portion of the nut 13 is caulked to a notch 15 formed on the inner surface of the bearing holder 7. The follower bevel gear 3 has a shoulder 3a which comes into contact with the inner end of the inner race 11i of the ball bearing 11 and a second nut 14 which clamps the inner race 11i in cooperation with the shoulder 3a is screwed to the outer circumferential surface of the final drive shaft 6. To prevent this second nut 14 from getting loose, a part 14a' of an annular reduced thickness portion formed on the inner circumferential surface and at the outer end portion of the nut 14 is caulked to a notch 16 formed on the outer circumferential surface of the final drive shaft 6.

Thus, the ball bearing 11 is firmly fitted to the bearing holder 7 and the final drive shaft 6 of the follower bevel gear 3 is firmly supported by the bearing holder 7. Since their movements in the two directions on the axis is reliably restricted and since the bevel gear 3 is of the helical gear type, the bearing holder 7 always bears a thrust load, that might occur on the bevel gear 3, via the bearing 11, even if the direction of the thrust load reverses at the time of the output operation when the gear 3 is driven by the mating bevel gear 2 and at the time of the reduced speed operation when it drives the mating bevel gear 2. Accordingly, the bevel gear 3 never undergoes axial displacement and no change occurs in the back-lash in its portion engaging with the mating bevel gear 2. This also holds true of the bevel gear 2 supported by the support device $S_1$.

On the other hand, the support shaft 5 of the bevel gear 3 is supported by the auxiliary gear box $B_a$ via a ball bearing 17 of an ordinary type.

An annular seal housing 18 is integrally formed at the outer end portion of the bearing holder 7 so that it projects outward from the screw portion of the first nut 13. An oil seal 19 which brings a seal lip into contact with the outer circumferential surface of the final drive shaft 6 is tightly put on the seal housing 18 outside the second nut 14 in order to prevent leak of a lubricant, that has passed through the ball bearing 11, from inside the auxiliary gear box $B_a$.

Incidentally, reference numeral 20 in the drawings represents a lubricaht nozzle and reference numerals 20a and 20b represent oil jet ports, respectively.

Assembly is carried out in the following manner. First, the ball bearing 11 and the bevel gear 3 are fitted to the bearing holder 7. After the first and second nuts 13, 14 are screwed, the oil seal 19 is fitted, providing in advance the assembly of the bearing holder 7 with the bevel gear 3. Next, the bearing holder 7 is fitted to the auxiliary gear box $B_a$ so as to interpose the shim 9 therebetween and the fitting flange 8 is finally fixed to the auxiliary gear box $B_a$ by the bolt 10. In this instance, the back-lash between both bevel gears 2 and 3 can be adjusted by selecting a suitable thickness of the shim 9.

What is claimed:

1. A device for supporting and sealing a final drive shaft bearing in a speed change gear, comprising:
   a gear box;
   a bearing holder having an axis and fitted and fixed to said gear box and having a stopper flange at an axially inner end thereof;
   a final drive shaft turnably supported by said bearing holder via a rolling element bearing and equipped with a helical bevel gear;
   said rolling element bearing having an outer race and an inner race;
   a first nut screwed to a cylindrical inner surface of said bearing holder and clamping said outer race of said rolling element bearing in cooperation with said stopper flange at the axially inner end of said bearing holder;
   a second nut screwed to an outer circumferential surface of said final drive shaft and abutting and clamping said inner race of said rolling element bearing in cooperation with said bevel gear;
   a seal housing integrally formed with said bearing holder and extending axially outside said first nut screwed to said bearing holder; and
   an oil seal disposed inside said seal housing and having a seal lip coming into direct contact with the outer circumferential surface of said final drive shaft, wherein said first and second nuts having axially outside ends, respectively, those outside ends being disposed substantially on a common plane extending perpendicular to the axis of the bearing holder.

2. A device as defined in claim 1, wherein said rolling element bearing consists of one double-row angular contact type bearing.

3. A device as defined in claim 1, wherein said first nut has a reduced thickness portion formed on the axially outside end thereof and said reduced thickness portion is partly caulked to a notch formed on said cylindrical inner surface of the bearing holder, while said second nut has a reduced thickness portion formed on the axially outside end thereof, the reduced thickness portion of the second nut being partly caulked to a notch formed on the outer circumferential surface of the final drive shaft.

* * * * *